United States Patent Office 3,555,920
Patented Jan. 19, 1971

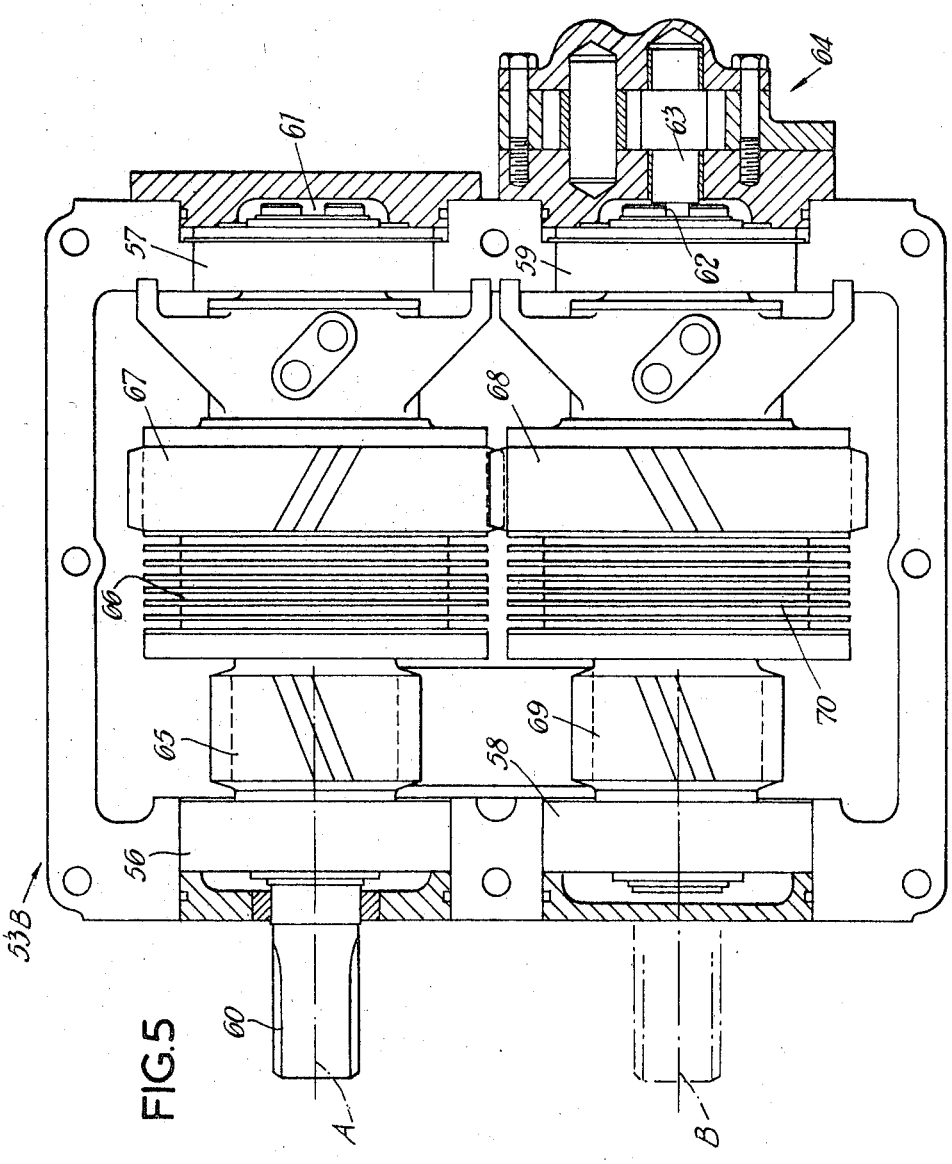

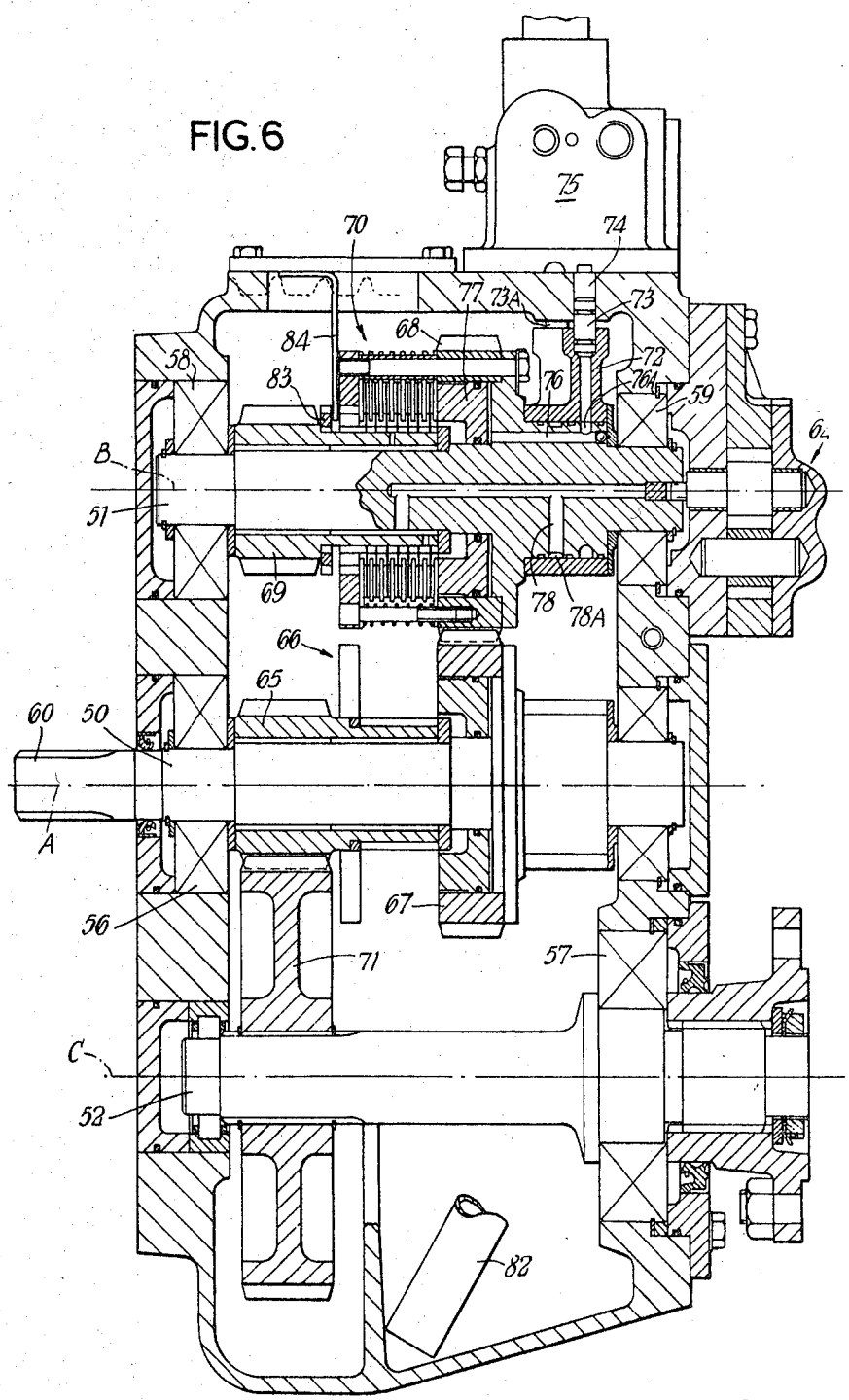

3,555,920
MARINE GEARBOXES
Henry Edward Merritt, Claverdon, England, assignor to P.R. Motors Limited, Warwickshire, England, a company of Great Britain
Filed Feb. 14, 1969, Ser. No. 799,407
Int. Cl. F16h *3/08*
U.S. Cl. 74—356        8 Claims

ABSTRACT OF THE DISCLOSURE

A gear box comprising three parallel shafts mounted in a casing that can be separated along a joint face that is coplanar with the rotational axes of two of said shafts, one of which is the input shaft, and the third of the three shafts being the output shaft and having its rotational axes offset from said plane.

---

This invention relates to gear boxes.

According to the present invention there is provided a gear box comprising three parallel shafts mounted in a casing that can be separated, along a joint face that is coplanar with the rotational axes of two of said shafts, to permit removal of these two shafts from the gear box, one of said two shafts being the input shaft of the gear box and the third of said three shafts being the output shaft of the gear box and having its rotational axis offset from said plane. Preferably the two said shafts are interchangeable one with the other.

Conveniently the said input shaft is connected always to drive the other of said two shafts in operation of the gear box via intermeshing gear means, and each of said two shafts carries pinion means selectively clutchable to the shaft that carires it, these pinion means both being engaged with a gear means fast with said output shaft, the arrangement being such that the direction of rotation imparted to said output shaft during operation of the gear box is dependent upon which of said pinion means is clutched to the shaft that carries it.

Figure 1:
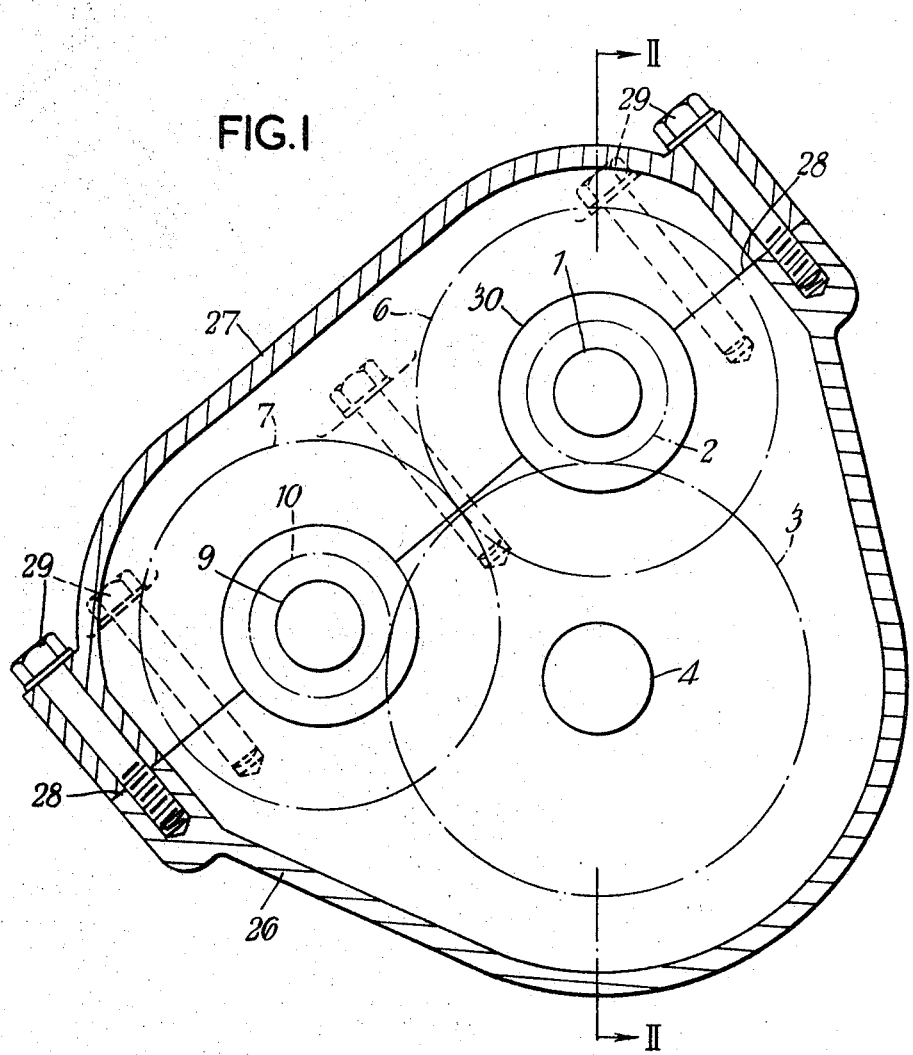
Figure 2:
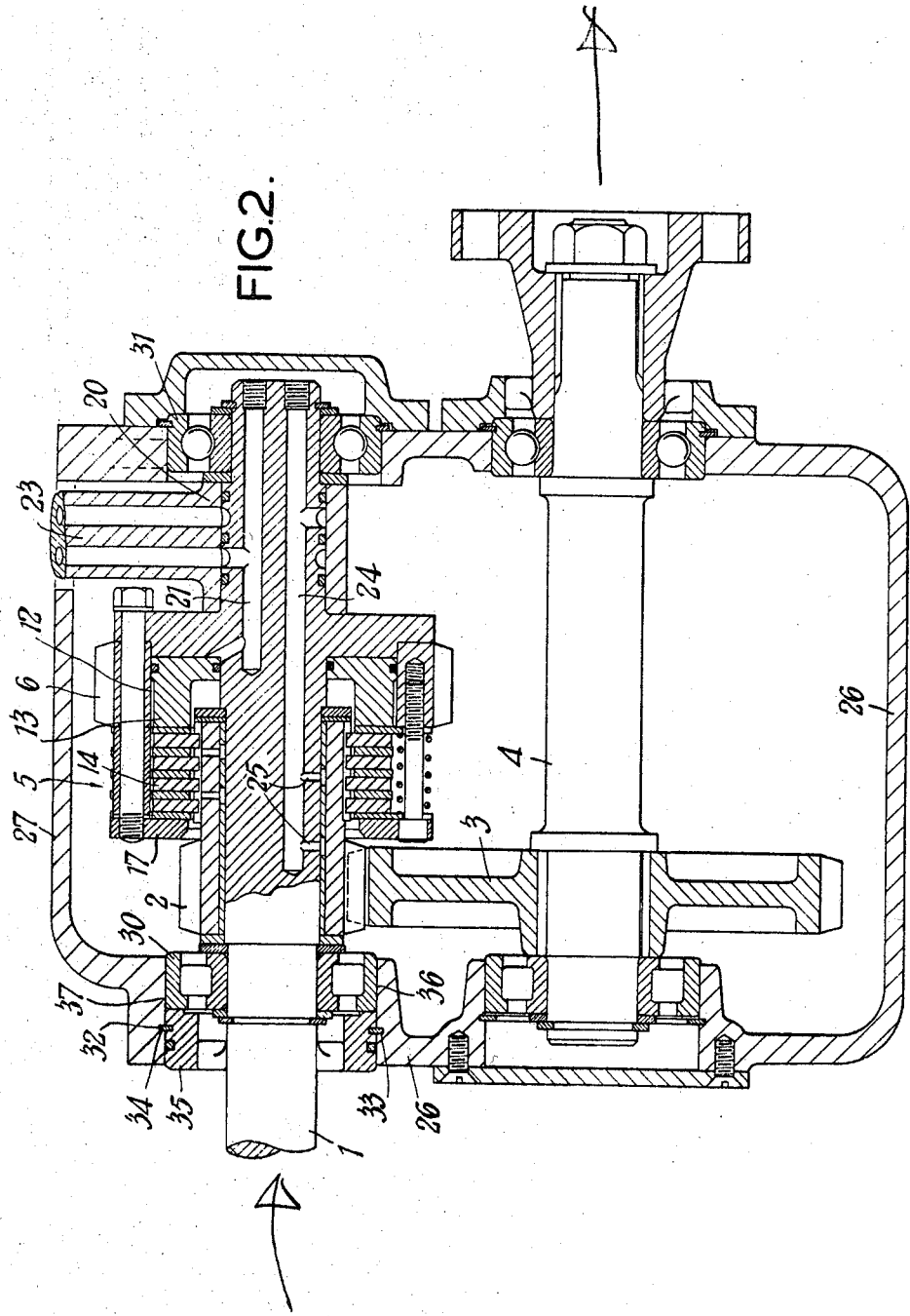
Figure 3:
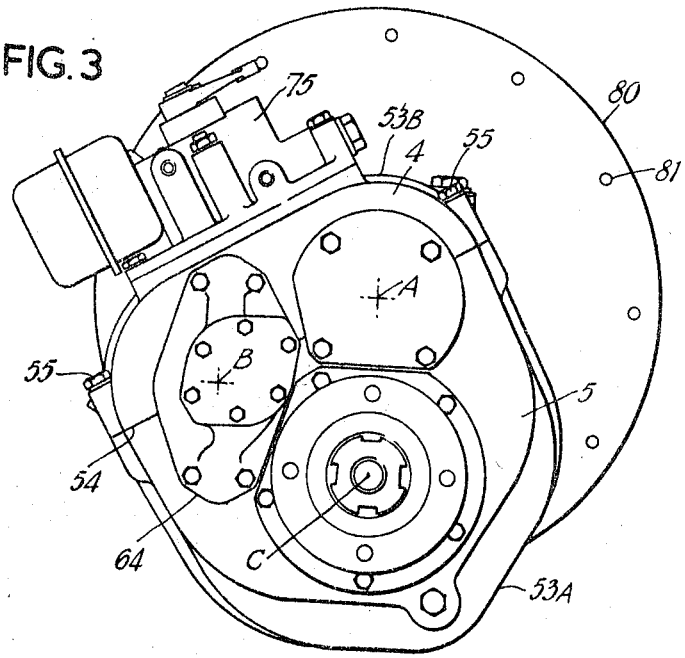
Figure 4:
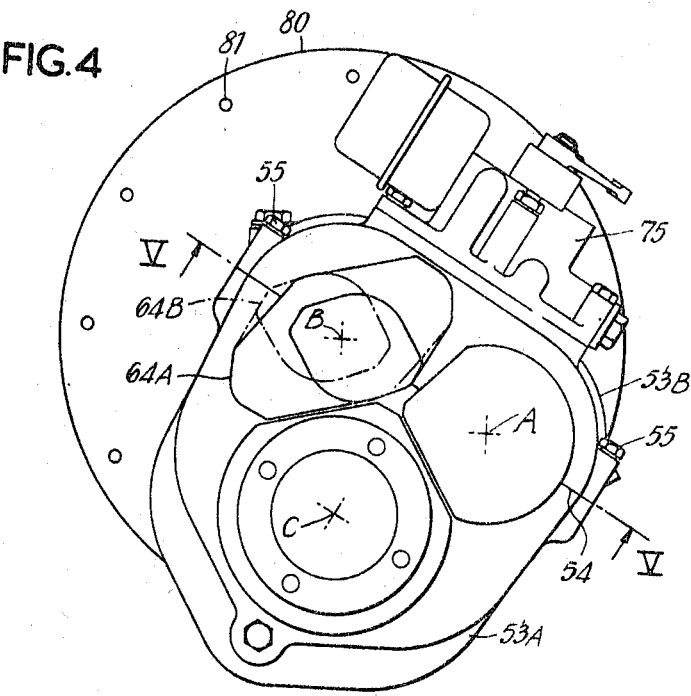

For a better understanding of the invention and to show how the same may be carried into effect reference will not be made, by way of example, to the accompanying drawings, in which:

FIG. 1 is a diagrammatic cross-sectional front view of a first form of gear box, FIG. 2 is a sectional side view of the gear box of FIG. 1, taken on the line II—II of FIG. 1, FIG. 3 is a rear view of a second form of gear box shown disposed in one position in which it can be secured to an engine, FIG. 4 is a diagrammatic rear view of the gear box of FIG. 3 showing the gear box disposed in a second position in which it can be secured to an engine, FIG. 5 is a diagrammatic sectional view of the gear box of FIGS. 3 and 4 taken on the line V—V of FIG. 4 with part of the casing of the gear box, and components mounted in this part, removed, and FIG. 6 is a diagrammatic sectional expanded view of the gear box of FIGS. 3 and 4.

The first form of gear box shown in FIGS. 1 and 2 of the drawings has an input shaft 1 that carries a driving pinion 2 which is in direct constant mesh with a gear 3 on an output shaft 4. The driving pinion 2 can be selectively clutched to the input shaft 1 by a clutch 5 (FIG. 2) which, in the form shown, is a hydraulically operated multidisc clutch in which the clutch discs 14 are operated by an annular piston 13 in a cylinder 12 that is fast with the shaft 1. The cylinder 12 carries bolted thereto a reaction plate 17 for the discs 14 and the cylinder 12 also carries a driving intermediate gear 6 (which is therefore fast with the shaft 1) which meshes with a driven intermediate gear 7 fast with a lay shaft 9. The gear 7 can be selectively clutched to a pinion 10 on the shaft 9 (whereby the pinion 10 is made fast with the shaft 9) in a similar manner to the clutching of the gear 6 with the pinion 2 that takes place when the pinion 2 is clutched with the shaft 1. The pinion 10 is in constant mesh with the gear 3 on the output shaft 4.

The parts so far described are mounted in a gearbox casing formed of a body part 26 and a removable cover part 27 that is bolted to the body part 26 by bolts 29. The plane of the joint face 28 between the cover part 27 and the body part 26 contains the axes of the shafts 1 and 9. The shaft 1 is supported by bearings 30, 31, which are accommodated between complenmentary semicircular recesses 36, 37, in the body part 26 and cover part 27 respectively so that, on removal of the latter to seperate the casing, the shaft 1 and bearings 30, 31, together with the pinion 2, clutch 5 and intermediate driving gear 6 on the shaft 1 can be bodily removed from the gearbox.

The shaft 9 is supported by bearings in a similar manner so that, together with the latter, the intermediate driven gear 7 and pinion 10 and clutch therebetween can be lifted with the shaft 9 from the gearbox.

At that end of the gearbox at which the shaft 1 projects from the gearbox for coupling to a driving engine, a shaft seal 35 on the shaft 1 is retentively held in place by a ring 32 (or in a modification, not shown, a flange) engaging semicircular grooves 33, 34, in the body part 26 and cover part 27 respectively so that on removal of the cover part 27 the seal 35 can be lifted out together with the shaft 1. Similarly in the case of the shaft 9 an end cap and/or shaft seal may be removably located in the same way. However other suitable shaft seal or end cap retention may be employed such as radial pins or projections from the semicircular recesses 36, 37 in the body part 26 and cover part 27 engaging radial holes in the seal or end cap and vice versa.

For driving the output shaft 4 in one direction such as a forward direction from the shaft 1, the clutch 5 is operated to clutch the pinion 2 to the shaft 1 for effecting a direct drive to the gear 3 on the output shaft 4. At the same time the pinion 10 is declutched from the shaft 9 so that the pinion 10 is free to be driven idly by the gear 3 while the intermediate gear 6 drives the intermediate gear 7 and shaft 9 for rotation relative to the pinion 10.

When it is required to drive the shaft 4 in the opposite or reverse direction, the clutch 5 is actuated to declutch the pinion 2 from the shaft 1 while the shaft 9 and intermediate driven gear 7 are clutched to the pinion 10. Reverse drive of the output shaft 4 is thus effected from the shaft 1 by the intermediate gear 6 fast with the latter to the driven intermediate gear 7 which is now clutched to the pinion 10 in mesh with the gear 3, the latter then idly driving the pinion 2.

For actuating the clutch 5, hydraulic fluid or oil is admitted to the cylinder 12 by means of a longitudinal passageway 21 in the shift 1 from a banjo connection 20 which latter also affords supply of oil to a further longitudinal passageway 24 and radial outlets 25 for the purpose of lubricating the bearing of the pinion 2 on the shaft 1 and also the clutch plates 14. Similar oil supply is also provided for longiutdinal passages in the lay shaft 9 for operation of the clutch (not shown) on the latter and for effecting similar lubrication.

Where the arm 23 of the banjor connection 20 passes through the cover part 27, it preferably has a detachable connection or coupling (not shown) with an oil supply pipe or pipes so that on disconnection of the latter the cover part 27 can then be removed for shaft removal in the manner already described.

As will be appreciated the ready manner in which the shafts 1, 9 and parts carried thereby can be removed from the gearbox considerably facilitates maintenance and inspection while the gearbox can be angularly positioned about the axis of the shaft 1 (and usually of the engine shaft connected thereto) for suitably positioning the cover part 27 for removal purposes especially in a marine installation. Furthermore, in the case where the shaft 9 has an associated end cap this can be removed, the shafts 1 and 9 and their associated components can be interchanged, the gearbox reorientated to suit the new disposition of the shafts 1 and 9 and the shaft 1 reconnected to the engine driving shaft.

The second form of gearbox shown in FIGS. 3 to 6 has three shafts 50, 51 and 52 respectively corresponding to the shafts 1, 9 and 4 of the first form of gearbox, the axes about which these parts 50, 51 and 52 rotate being indicated as A, B and C. The casing of the gearbox is formed in two parts 53A and 53B of which the part 53A is a body part and the part 53B is a cover part. The plane of the joint face 54 between the two parts 53A and 53B contains the axes A and B. In FIG. 5 the part 53A has been removed. The two parts 53A and 53B are secured together, in the assembled condition of the gearbox (FIGS. 3 and 4) by bolts 55. In this condition the shafts 50 and 51 are supported in the casing by bearings 56, 57 and 58, 59 respectively, each of which is accommodated between complementary semicircular recesses formed in the casing parts 53A and 53B so that, upon separation of the casing parts, the shafts 50 and 51, together with the bearings 56 to 59 and other associated components, can be removed from the gearbox in a manner similar to that described with reference to the first form of gearbox.

The bearings 56 and 57 and their seatings in the casing parts 53A and 53B are identical with the bearings 58 and 59 and their seatings so that the shafts 50 and 51 can be interchanged. The shaft 50 carries an extension 60 that serves for coupling the shaft 50 to the output shaft of an engine. Each of the shafts 50 and 51 has a driving dog 61 or 62 at its rear end, the dog 61 or 62 of the shaft 50 or 51 that is mounted for rotation about the axis B being engaged with the drive shaft 63 of an oil pump 64 that can be bolted onto the gear casing in either of two positions, disposed at 180° to each other, respectively indicated in FIG. 4 by the full lines 64A and the chain dot lines 64B.

The shaft 50 carries a pinion 65, a friction clutch 66 for clutching the pinion 65 to the shaft 50, and a gear 67 fast with the shaft 50 and in mesh with an identical gear 68 fast with the shaft 51. This shaft 51 also carries a pinion 69 corresponding to the pinion 65, and a friction clutch 70 for clutching the pinion 69 to the shaft 51. Referring particularly to FIG. 6, in the condition of the gearbox depicted therein the shaft 50 that serves as the input shaft is mounted for rotation about the axis A and the shaft 51 is mounted for rotation about the axis B and is hence connected to drive the oil pump 64. The pinion 65 of the shaft 50 is in mesh with a gear 71 fast with the shaft 52, which constitutes the output shaft of the gearbox. Although not apparent from FIG. 6, which is an expanded view, the pinion 69 of the shaft 51 is also in mesh with the gear 71. Thus, as in the case of the first form of gearbox described above, the direction of rotation imparted to the output shaft 52 from the input shaft 50 depends upon which of the two friction clutches is engaged, the drive passing from the shaft 50 either via the pinion 65 and the gear 71 (with the clutch 66 engaged, the clutch 70 disengaged and the shaft 51 running idly), or via the gears 67 and 68, the pinion 69 and the gear 71 (with the clutch 66 disengaged and the clutch 70 engaged). Thus, by selective engagement of the clutches 66 and 70 the direction of rotation of the shaft 52 can be reversed, the speed thereof remaining constant for any given rotational speed of the input shaft.

FIG. 6 also shows a banjo connection 72 that surrounds a portion of the shaft 51 so as to be stationary during rotation of the shaft. A similar banjo connection (not shown) surrounds a portion of the shaft 50. The banjo connection 72 terminates in a nipple 73 so arranged that when the gear case part 53B is lowered onto the part 53A in order to complete the assembly the nipple 73 enters a corresponding hole 74 which communicates with oil passages in a valve block 75 carried by the gear case part 53B. The nipple 73 leads, via a groove 76A around the shaft 51, to a conduit 76 formed by a hole drilled in the shaft 51 and by which pressure oil may be directed to a piston 77 that works in a cylinder formed within the gear 68 and that actuates the friction clutch 70. A second nipple 73A similarly arranged to enter a corresponding hole in the gearcase part 53B leads, via a groove 78A around the shaft 51, to a conduit 78 by which cooling oil is directed onto the plates of the friction clutch 70. The friction clutch 66 is actuated, and its plate lubricated, in similar manner from the banjo connection that surrounds the shaft 50.

It will be noted from the figures that in both the forms of gearbox described above the three shafts 1, 9 and 4 or 50, 51 and 52 are symmetrically arranged with respect to the plane containing the axes of two of the shafts. One of these two shafts constitutes the input shaft of the gearbox and the third shaft, constituting the output shaft of the gearbox, is offset from the input shaft. It is desirable in gearboxes for marine propulsion, where the power source is an internal combustion or diesel engine, that the axis of the output shaft should be offset from that of the engine. It is further desirable, in the case of single-engined craft, that the output shaft (i.e. the propeller shaft) has its axis of rotation in the same vertical plane as the axis of rotation of the engine crank shaft, but arranged below it. In the case of twin-engined craft an alternative requirement can be that the propeller shafts should be offset laterally in relation to their respective engines, either in a horizontal or in an inclined plane. The symmetrical arrangement of the shafts of each of the gearboxes described above, and the offsetting of the output shaft of each gearbox with respect to the input shaft of the gearbox, enables the requirements just discussed to be met. This is illustrated, for the second form of gearbox, in FIGS. 3 and 4. In each of these figures the output shaft (that rotating about the axis C) is offset from and disposed below the input shaft (that rotating about the axis A in FIG. 3 and that rotating about the axis B in FIG. 4). In FIG. 3 the axes A and C lie in a common vertical plane and in FIG. 4 the axes B and C lie in a common vertical plane. The alternative mounting positions of the gearbox are obtained by mounting the gearbox on the bell housing of the driving engine utilising a circular adaptor plate 80 having a number of equally spaced bolt holes 81 extending therearound and by means of which the gearbox can be attached to the bell housing of the engine. It will be appreciated that with such an arrangement the gearbox can be mounted on an engine with the plane of the axes A and C (for example) vertical as shown in FIG. 3 or (in a case where twelve equally spaced holes 81 are provided) horizontal or in intermediate positions varying by intervals of 30°. It will be noted that the positions of the gearbox shown in FIGS. 3 and 4 have a mirror image relationship. This relationship can be obtained with the axes of the input and output shafts in inclined planes or in a horizontal plane, and it will also be appreciated that, for each of the possible positions of the output shaft relative to the driving-engine centre line, the gearbox can be mounted on the adaptor plate in either of two positions.

The oil pump 64 is of a conventional gear type, but, as already described, its fixing holes are so arranged that it can be bolted onto the gear casing in either of two positions disposed at 180° with respect to each other. In this way the pump can be mounted to deliver oil in the same direction from an oil reservoir formed by the lower part of the gearbox, via an inclined suction pipe 82 (FIG. 6), to the valve block 75 by placing the pump in a position on the gearcase selected according to the position, and direction of rotation, of the input shaft.

The gearbox shown in FIGS. 3 to 6 also incorporates mechanism associated with each of the clutches 66 and 70 that can be actuated to lock the drive in the event of failure of the associated friction clutch to transmit the drive, for example because of excessive wear of the friction plates of the clutch, or failure of the hydraulic system. The mechanism associated with the clutch 70 is shown in FIG. 6 and consists of a ring 83 splined to the shank of the pinion 69 so as to be rotationally fast therewith but axially slidable. The ring 83 carries splines around its outer periphery capable of engaging with corresponding splines formed in the inner bore of the reaction plate of the clutch 70. Normally the ring 83 is held out of engagement with the reaction plate by a light steel arm 84, as shown in FIG. 6. This arm 84 is carried by the cover part 53B of the gearbox casing so that, upon removal of the cover part 53B, the ring 83 can be moved axially into engagement with the reaction plate of the clutch 70 whilst remaining in driving engagement with the splines on the shank of the pinion 69, whereby the clutch 70 is overridden and the pinion 69 is clutched, via the ring 83, with the shaft 51. When the cover part 53B is replaced the arm 84 acts to retain the ring 83 in engagement with the reaction plate of the clutch 70. The mechanism associated with the clutch 66 is similar to that just described in detail. It will be appreciated that mechanism such as that just described can be provided in association with one only of the clutches 66 and 70.

When a pair of gearboxes, such as those described above, are utilised in, for example, a twin-engined craft, the driving engines can be run in the same direction as one another whilst the respective propellers driven thereby can be driven, through the gearboxes, to rotate in opposite directions but at the same speeds for equal engine speeds.

What I claim as my invention and desire to secure by Letters Patent is:

1. A gear box comprising a casing having three parallel shafts mounted therein, the casing being separable, along a joint face that is coplanar with the rotational axis of two of said shafts to permit removal of these two shafts from the gear box, one of said two shafts being the input shaft of the gear box and the third of said three shafts being the output shaft of the gear box and having its rotational axis offset from said plane, said input shaft being connected always to drive the other of said two shafts in operation of the gear box via intermeshing gear means, and wherein each of said two shafts carries pinion means selectively clutchable to the shaft that carries it, these pinion means both being engaged with a gear means fast with said output shaft, the direction of rotation imparted to said output shaft during operation of the gear box being dependent upon which of said pinion means is clutched to the shaft that carries it, each of said pinion means being clutchable to the shaft that carries it by means of a hydraulically-operated friction clutch also carried by the shaft that carries the pinion means, each of said two shafts having formed in it a fluid supply conduit for the clutch that it carries and being provided with a banjo connection that surrounds a portion of the shaft in which the conduit is formed through which banjo connections the conduits are connected to a source of fluid under pressure.

2. A gear box as claimed in claim 1, in which said three shafts are symmetrically disposed with respect to the plane of said joint face and said two shafts.

3. A gear box as claimed in claim 1, in which said two shafts are interchangeable one with the other.

4. A gear box as claimed in claim 1, in which there is associated with at least one of the friction clutches a mechanism adapted to be actuated to override the friction clutch and clutch the pinion means associated with the friction clutch to the shaft that carries this pinion means.

5. A gear box as claimed in claim 4, in which each banjo connection has a further nipple that is entered in a further aperture connected with said valve block, each said further nipple leading to a further conduit in the associated shaft, which further conduit serves for directing cooling fluid to the friction plates of the clutch carried by the last-mentioned shaft.

6. A gear box as claimed in claim 1, in which each of the banjo connections is mounted so as to be stationary during rotation of the shaft a portion of which it surrounds, each banjo connection having a nipple through which, in operation, fluid is supplied to the conduit associated with the banjo connection, this nipple being entered in an aperture which communicates with oil passages in a valve block, and in which the position in the gear box of each nipple and its associated aperture is such that upon separation of said casing along said joint face the nipples are removed from their associated apertures.

7. A gear box as claimed in claim 1, in which said two shafts are interchangeable one with the other, and in which said source of fluid under pressure is a gear pump mounted on said casing, and wherein each of said two shafts carries means for driving said gear pump so that said gear pump can be driven by whichever of said two shafts is positioned to drive the gear pump.

8. A gear box as claimed in claim 7, in which the position of the gear pump can be altered relative to the shaft that is positioned to drive it, the direction of flow of fluid from the pump in operation being the same for rotation of the last-mentioned shaft in one direction with the gear pump in one position, and for rotation of this shaft in the reverse direction with the gear pump in another position.

References Cited

UNITED STATES PATENTS

| | | | |
|---|---|---|---|
| 2,729,981 | 1/1956 | Budzien | 74—361 |
| 2,851,895 | 9/1958 | Aschuer | 74—361 |
| 3,105,395 | 10/1963 | Perkins | 74—331X |

ARTHUR T. McKEON, Primary Examiner

U.S. Cl. X.R.

74—331